(12) United States Patent
Tankovich et al.

(10) Patent No.: US 8,161,036 B2
(45) Date of Patent: Apr. 17, 2012

(54) INDEX OPTIMIZATION FOR RANKING USING A LINEAR MODEL

(75) Inventors: Vladimir Tankovich, Bellevue, WA (US); Dmitriy Meyerzon, Bellevue, WA (US); Mihai Petriuc, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 12/147,666

(22) Filed: Jun. 27, 2008

(65) Prior Publication Data

US 2009/0327266 A1 Dec. 31, 2009

(51) Int. Cl.
*G06F 17/30* (2006.01)
(52) U.S. Cl. .......... 707/715; 707/741; 707/753
(58) Field of Classification Search .......... 707/999.005, 707/713, 715, 741, 753
See application file for complete search history.

(56) References Cited

U.S. PATENT DOCUMENTS

| | | | |
|---|---|---|---|
| 5,404,514 A * | 4/1995 | Kageneck et al. ........... 1/1 |
| 5,893,092 A | 4/1999 | Driscoll |
| 5,915,249 A * | 6/1999 | Spencer ........... 707/742 |
| 5,920,854 A | 7/1999 | Kirsch et al. |
| 6,018,733 A * | 1/2000 | Kirsch et al. ........... 1/1 |
| 6,243,713 B1 * | 6/2001 | Nelson et al. ........... 1/1 |
| 6,363,379 B1 | 3/2002 | Jacobson et al. |
| 6,523,030 B1 * | 2/2003 | Horowitz ........... 1/1 |
| 6,529,916 B2 | 3/2003 | Bergman et al. |
| 6,701,318 B2 | 3/2004 | Fox et al. |
| 6,738,760 B1 * | 5/2004 | Krachman ........... 1/1 |
| 6,738,764 B2 | 5/2004 | Mao et al. |
| 6,862,713 B1 | 3/2005 | Kraft et al. |
| 6,947,920 B2 | 9/2005 | Alpha |
| 6,954,750 B2 | 10/2005 | Bradford |
| 7,136,854 B2 | 11/2006 | Smith et al. |
| 7,149,748 B1 | 12/2006 | Stephan |
| 7,356,527 B2 * | 4/2008 | Carmel et al. ........... 1/1 |
| 7,415,445 B2 * | 8/2008 | Forman ........... 706/20 |
| 7,467,132 B2 * | 12/2008 | Nakayama et al. ........... 1/1 |
| 7,487,141 B1 * | 2/2009 | Stephan ........... 1/1 |
| 7,548,917 B2 | 6/2009 | Nelson |
| 7,567,959 B2 * | 7/2009 | Patterson ........... 1/1 |
| 7,689,617 B2 * | 3/2010 | Parikh ........... 707/737 |
| 7,693,813 B1 * | 4/2010 | Cao et al. ........... 707/999.001 |
| 7,831,587 B2 * | 11/2010 | Dymetman ........... 707/711 |
| 8,046,370 B2 | 10/2011 | Wen et al. |
| 2004/0267722 A1 | 12/2004 | Larimore et al. |
| 2005/0060290 A1 | 3/2005 | Herscovici et al. |

(Continued)

OTHER PUBLICATIONS

Agichtein et al., "Improving Web Search Ranking by Incorporating User Behavior Information", ACM, SIGIR'06, Aug. 6-11, 2006, 8 pages.*

(Continued)

*Primary Examiner* — Hung T Vy
*Assistant Examiner* — Phuong Thao Cao
(74) *Attorney, Agent, or Firm* — Hope Baldauff Hartman, LLC

(57) ABSTRACT

Technologies are described herein for providing a more efficient approach to ranking search results. One method reduces an amount of ranking data analyzed at query time. In the method, a term is selected, at index time, from a master index. The term corresponds to a number of documents greater than a threshold. A set of documents that includes the term is selected based on the master index. A rank is determined for each document in the set of documents that contains the term. Each document in the set of documents that contains the term is assigned to a high ranking index or a low ranking index based on the simple rank.

11 Claims, 7 Drawing Sheets

U.S. PATENT DOCUMENTS

| | | | |
|---|---|---|---|
| 2005/0222977 A1* | 10/2005 | Zhou et al. | 707/3 |
| 2006/0106792 A1* | 5/2006 | Patterson | 707/5 |
| 2006/0129538 A1* | 6/2006 | Baader et al. | 707/3 |
| 2006/0195406 A1* | 8/2006 | Burges et al. | 706/12 |
| 2006/0195440 A1* | 8/2006 | Burges et al. | 707/5 |
| 2006/0212443 A1* | 9/2006 | Oyarce | 707/5 |
| 2007/0150473 A1 | 6/2007 | Li et al. | |
| 2007/0203891 A1* | 8/2007 | Solaro et al. | 707/3 |
| 2007/0271268 A1* | 11/2007 | Fontoura et al. | 707/6 |
| 2008/0016050 A1 | 1/2008 | Stensmo | |
| 2008/0195595 A1* | 8/2008 | Masuyama et al. | 707/5 |
| 2008/0195601 A1 | 8/2008 | Ntoulas et al. | |
| 2008/0313178 A1* | 12/2008 | Bates | 707/5 |
| 2009/0006360 A1* | 1/2009 | Liao et al. | 707/5 |
| 2009/0089256 A1 | 4/2009 | Transier et al. | |
| 2009/0112843 A1* | 4/2009 | Hsu et al. | 707/5 |
| 2009/0193011 A1* | 7/2009 | Blair-Goldensohn et al. | 707/5 |
| 2009/0198672 A1* | 8/2009 | Jones et al. | 707/5 |
| 2009/0216750 A1 | 8/2009 | Sandoval et al. | |
| 2009/0248666 A1* | 10/2009 | Ahluwalia | 707/5 |
| 2010/0063878 A1* | 3/2010 | Bachet et al. | 705/14.49 |
| 2011/0004588 A1 | 1/2011 | Leitersdorf et al. | |

OTHER PUBLICATIONS

Agichtein, et al., "Improving Web Search Ranking by Incorporating User Behavior Information," downloaded Apr. 29, 2008.

Berchtold, et al., "Fast Nearest Neighbor Search in High-dimensional Space," 14th International Conference on Data Engineering (ICOE '98), Feb. 23-27, 1998, Orlando, Florida.

Zhao, et al., "Adapting Document Ranking to Users' Preferences Using Click-through Data," downloaded Apr. 29, 2008.

Long, et al. "Optimized Query Execution in Large Search Engines with Global Page Ordering", 2003, In the Proceedings of the $29^{th}$ VLDB Conference, 12 Pages.

U.S. Notice of Allowance dated Dec. 21, 2011 in U.S. Appl. No. 12/690,100.

* cited by examiner

INDEX OPTIMIZATION FOR RANKING USING A LINEAR MODEL

BACKGROUND

Search engines are a commonly used tool for identifying relevant documents from indexed document collections stored locally on disk or remotely over a private or public network, such as an enterprise network or the Internet, respectively. In a document search, a user typically enters a query into a search engine. The search engine evaluates the query against the document collection and returns a set of candidate documents (i.e., a filtered set) that matches the query. If the query is made through a web browser, for example, then the filtered set may be presented as a list of uniform resource locators ("URLs").

A typical query includes one or more keywords. The search engine may search for the keywords in numerous sources, including the body of documents, the metadata of documents, and additional metadata that may be contained in data stores (e.g., anchor text). Depending on the implementation, the search engine may search for documents that contain all of the keywords in the query (i.e., a conjunctive query) or for documents that contain one of more of the keywords in the query (i.e., a disjunctive query). In order to process the queries efficiently, the search engine may utilize an inverted index data structure that maps keywords to the corresponding documents. The inverted index data structure enables a search engine to easily determine which documents contain one or more keywords.

For large collections of documents, the cardinality of the candidate documents can be very large (potentially in the millions), depending on the commonality of the keywords in the query. It would be frustrating for users if they were responsible for parsing through this many results. In order to reduce the number of search results and to provide more relevant search results, many search engines rank the candidate documents according to relevance, which is typically a numerical score. In this way, the search engine may sort results according to ranking and return only the most relevant search results to the user. The relevance may be based upon one or more factors, such as the number of times a keyword appears in a document and the location of the keyword within the document.

While numerous methodologies exist for ranking candidate documents, these methodologies typically rank the entire filtered set. When the filtered set is sufficiently large (e.g., when the collection of documents is large and the query includes common words), ranking the entire filtered set can be resource intensive and create performance problems. In particular, not only can the ranking operation be computationally expensive, but reading the necessary data from disk to rank the candidate documents can be time consuming. By reducing the number of candidate documents in the filtered set, the ranking operation can be more efficiently performed and the amount of data read from disk can be significantly reduced. However, randomly removing candidate documents from the filtered set may eliminate potentially relevant search results.

It is with respect to these considerations and others that the disclosure made herein is presented.

SUMMARY

Technologies are described herein for providing a more efficient approach to ranking search results. In particular, an index optimization for ranking search results is described herein that includes pre-processing operations at index time as well as real-time or near real-time operations at query time that utilize data generated during the pre-processing operations. The index optimization decreases the time utilized to process expensive queries directed at large filtered sets.

According to one aspect presented herein, a computer program is provided for reducing an amount of ranking data analyzed at query time. At index time, the computer program selects a term from a master index, such as an inverted index mapping a collection of terms to the documents containing the terms. The selected term is contained in a number of documents greater than a threshold. The threshold indicates whether the selected term is considered common for purposes of index optimization.

Upon selecting the term, the computer program selects, from the master index, a set of documents containing the term and determines a rank, such as a linear rank, for each document in the set. The computer program then maps each document in the set to the selected term in a high ranking index for that term or a low ranking index for that term based on the rank. For example, documents with a higher rank may be included in the high ranking index, while documents with a lower rank may be included in the low ranking index.

At query time, the computer program the computer program receives a query. The computer program then determines whether a term in the query is considered common. Top document list is populated with documents that satisfy the query and contain at least one not common term or are in a high ranking index for a common term.

Upon populating the top document list, the computer program forwards the top document list to a ranking function, such as a computationally intensive neural network. If the query contains one or more common terms, the top document list may be significantly smaller in size than a conventional filtered set. As such, the ranking function can be more efficiently performed on the top document list in order to generate search results in response to the query.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
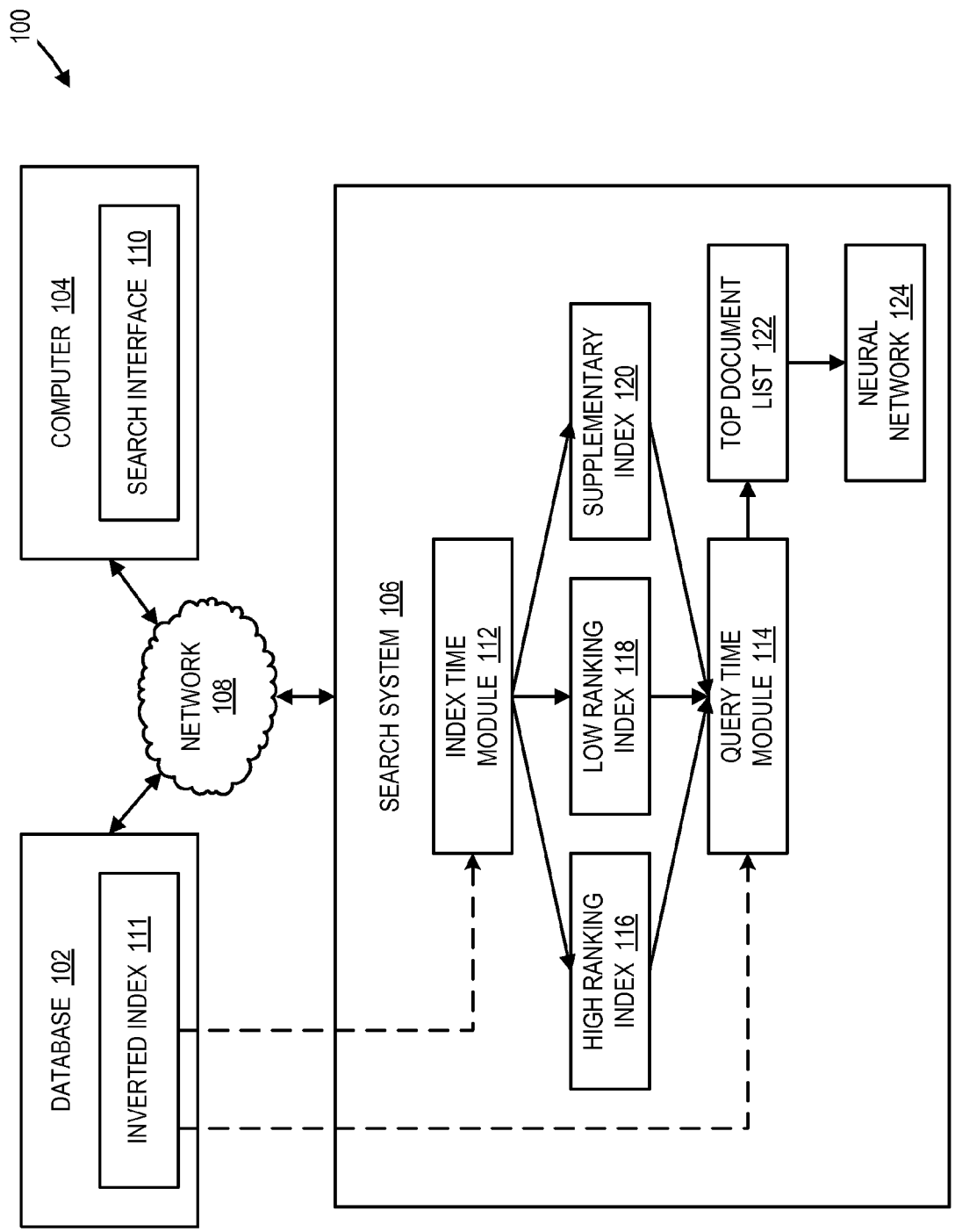
FIG. 1 is a network architecture diagram showing a search system adapted to implement an index optimization, in accordance with one embodiment.

The following detailed description is directed to technologies for providing a more efficient approach to ranking search results. In particular, an index optimization for ranking search results is described herein that decreases the time utilized to process expensive queries directed at large filtered sets.

The index optimization includes at least two stages: (1) an index time pre-calculation of ranking data; and (2) a query time ranking based on the pre-calculated data. At index time, for each common term in an inverted index, a simple rank, such as a linear rank, is calculated for each document corresponding to the term. At query time, the linear rank may be utilized to identify a relevant subset of documents without accessing every document that satisfies a query. This relevant subset of documents may be re-ranked according to one or more computationally expensive ranking functions (e.g., neural networks) and provided to a user in response to the query.

Embodiments described herein are generally directed to search systems. Search systems may implement various search techniques to search, retrieve, score, rank, display, and perform other search operations designed to provide relevant search results in response to a search query. The search results may include, for example, a list of resources derived from various information sources. In some cases, the information sources may reside on a single device, such as resources in a file system for a personal computer. In other cases, the information sources may reside on multiple devices, such as resources on network servers accessible via a communications network. In both cases, a search application may receive a search query having multiple search terms, search for resources, such as documents or web pages that have some or all of the search terms, and return a list of resources or resource identifiers (e.g., a URL) matching the search query.

The index optimization described herein is primarily designed for responding to queries in which the filtered set contains a relatively large number of candidate documents. The filtered set may be large because a large collection of documents is searched and a query includes terms common in many of those documents. The index optimization presented herein shifts some of the data analysis that can be performed at query time to index time. This approach is particularly useful in situations where the query time calculations are computationally expensive and/or time-consuming. Although not so limited, the embodiments described herein refer primarily to an implementation where the terms within a query are conjunctive. Thus, a search engine will find documents that include every term in a query.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for ranking search results based on an index optimization technique will be described. FIG. 1 shows an illustrative network architecture 100 configured to implement an embodiment of the index optimization feature described herein. In particular, the network architecture 100 includes a database 102, a computer 104, and a search system 106, each of which is coupled to a network 108. In other embodiments, the database 102, the computer 104, and/or the search system 106 may be locally coupled.

The computer 104 includes a search interface 110 in which a user utilizing the computer 104 can input a query, submit the query to the search system 106, and display the search results returned from the search system 106. In one embodiment, the search interface 110 is provided through a web browser configured to access a search engine via a private or public computer network, such as the network 108. In another embodiment, the search interface 110 is provided by a standalone computer application executed on the computer 104.

The search system 106 receives the query, retrieves search results from the database 102 to satisfy the query, and transmits the search results to the computer 104. In one embodiment, the database 102 includes an inverted index 111, which maps query terms (e.g., words, numbers, strings, etc.) to the documents that include the query terms. Although not so illustrated in FIG. 1, the database 102 may further store documents and associated document information, such as document properties or metadata, related to the documents.

The inverted index 111 provides the search system 106 with information that is useful for performing an efficient search without the need to parse through entire documents. By utilizing the inverted index 111, the search system 106 can efficiently identify documents that contain every term in a query. For example, in a query that includes two terms, a first term may map to a first set of documents {A, B, C}, and the second term may map to a second set of documents {B, C, D} according to the inverted index 111. A merge operation on the first set of documents and the second set of documents reveals that the two terms in the query map to the documents {B, C}. It should be appreciated that the inverted index 111 may also be stored locally on the search system 106 or on another suitable computer system. The inverted index 111 may also be referred to herein as a master index.

As illustrated in FIG. 1, an embodiment of the search system 106 includes an index time module 112 and a query time module 114. The index time module 112, which operates at index time, calculates a linear rank for each document including one or more terms in the inverted index 111. According to embodiments, the linear rank is calculated for only common terms, which are defined herein as terms that are found in a sufficiently large number of documents in the inverted index 111 (e.g., in at least 50,000 documents in an index containing 20 million documents). For each document containing one or more of these common terms, a linear rank is calculated.

The search system 106 further includes a high ranking index 116 and a low ranking index 118. The high ranking index 116 maps each common term to one or more documents that have a linear rank above a threshold. In contrast, the low ranking index 118 maps each common term to one or more documents that have a linear rank below the threshold. The high ranking index 116 and the low ranking index 118 may also store at least part of the linear rank, such as the BM25F value or the term rank, for each term-document pair in the included documents. In one embodiment, a supplementary index 120 is also provided that includes a static rank for each of the corresponding documents.

The query time module 114, which operates at query time, receives a query containing one or more terms from the computer 104. For each term in the query, the query time module 114 determines whether the term is a common term. As previously discussed, common terms are included in the high ranking index 116 and/or the low ranking index 118. The top document list 122 is then populated with a subset of documents that match the query and have at least one term that satisfies a condition. In one embodiment, the condition may be either that the term is not common or that the document including the term is from the high ranking index 116. Data contained in the low ranking index 118 may be used to calculate linear rank at query time for documents that are contained in the low ranking index 118 and include one or more common terms.

In one embodiment, linear rank may be used to limit the number of documents in top document list 122 to a small number relative to the total number of documents in the inverted index 111 (e.g., about 2000 documents in an index containing 20 million documents). Upon generating the top document list 122 using the linear rank for the query, the query time module 114 forwards the top document list 122 to a neural network 124, which re-ranks the top document list 122 according a neural network model or other suitable ranking function.

As used herein, the term index time refers to a time before a query is received from a user through the computer 104. For example, operations performed by the index time module 112 may be referred to as pre-calculations because these operations reduce the amount of data that is analyzed at query time when a query is actually requested. The term query time refers to a time after a query is received from a user and when the query is being processed. The length of the query time may depend, at least in part, on the ability for the search system 106 to timely and efficiently respond to the query. As such, by reducing the disk reading and computation time utilized by the query time module 114 and the neural network 124 to satisfy the query, the query time as a whole can be reduced.

Figure 2:
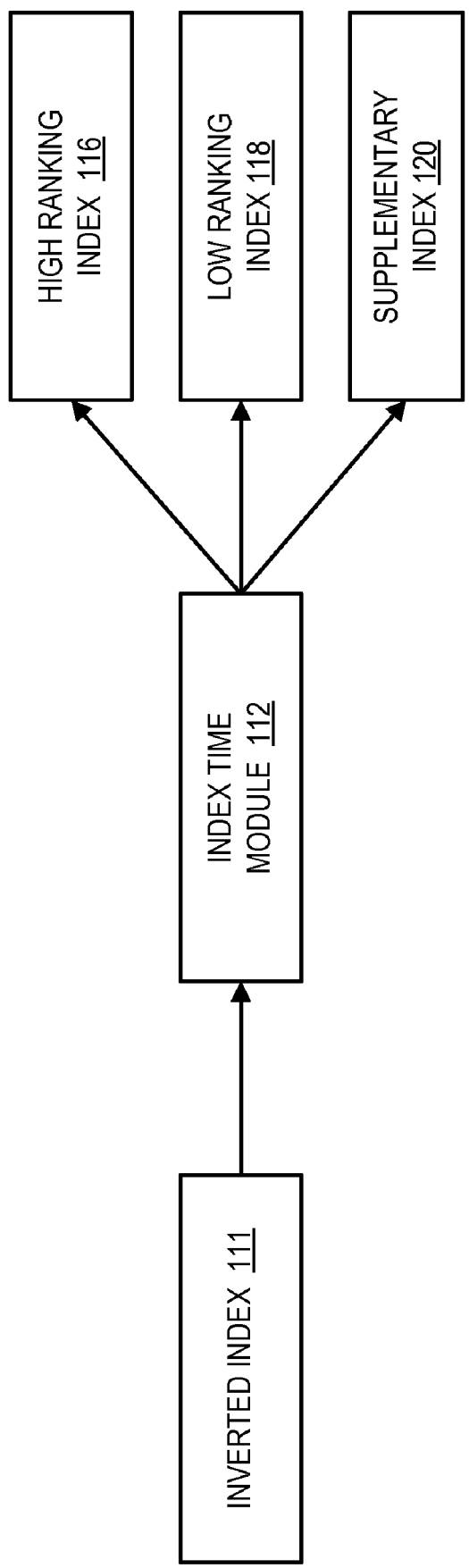
FIG. 2 is a block diagram showing the operation of the index time module, in accordance with one embodiment.

Referring now to FIG. 2, additional details will be provided regarding an illustrative implementation of the index time module 112. As illustrated in FIG. 2, the index time module 112 receives or accesses the inverted index 111 and generates a high ranking index 116, a low ranking index 118, and a supplementary index 120 based on data stored in the inverted index 111. As previously described, the high ranking index 116 and the low ranking index 118 contain only common terms (i.e., terms found in a sufficiently large number of documents relative to the size of the inverted index 111). Further, as previously described, the supplementary index 120 includes a static rank for each document. Other terms that are not considered common terms are effectively ignored in this embodiment.

An illustrative equation for determining the linear rank, which is denoted below as linear_rank, is shown below in equation (1).

$$\text{linear\_rank} = w_{BM25} * \sum \text{term\_rank} \times \log\left(\frac{N}{n}\right) + \text{static\_rank} \quad (1)$$

The variable $w_{BM25}$, refers a weight accorded to the BM25F ranking function, which is denoted in the equation (1) as the follow expression.

$$\sum \text{term\_rank} \times \log\left(\frac{N}{n}\right)$$

The BM25F ranking function is an equation that ranks a document according to multiple document characteristics (e.g., term frequency, document length, etc.). The result of the BM25F ranking function is a single value that can be easily compared with other values to determine a relative relevance for each document.

In equation (1), the variable N refers to the total number of documents in the search domain, and the variable n refers to a subset of the N documents containing the given term. The static rank, which is denoted as static_rank in equation (1), is a value denoting any properties of the documents that are not dependent on the query. These properties may also be referred to herein as query-independent properties. For example, the static rank may be higher for a presentation document than for a spreadsheet document, thereby indicating that the presence of the given term in the presentation document is generally more relevant than the presence of the given term in the spreadsheet document.

The term rank, which is denoted in equation (1) as term_rank, refers to an individual ranking for each term within a given document. An illustrative equation for determining the term rank is shown below in equation (2).

$$\text{term\_rank} = \frac{tf'_t(k_1 + 1)}{k_1 + tf'_t} \quad (2)$$

The variable $tf'_t$ refers to term frequency determination where the variable t is an individual query term. The variable $k_1$, refers to the curvature. An illustrative equation for determining $tf'_t$ is shown below in equation (3).

$$tf'_t = \sum_{p \in D} tf_{tp} \cdot w_p \cdot \frac{1}{(1-b) + b\left(\frac{DL_p}{AVDL_p}\right)} \quad (3)$$

The variable p is an individual property of the given document denoted by D. The variable $tf_{tp}$ refers to a term frequency of term t in the property p. The variable $w_p$ refers to the weight for the property p. The variable b refers to the length normalization of the property p. The variable $DL_p$ refers to a length of the property p. The variable $AVDL_p$ refers to the average length of the property p.

As used herein, the property p refers to fields associated with the document in which the individual search terms may be found. In one embodiment, the fields include body, title, author, anchor text, URL display name, and extracted title. It should be noted that some of the fields (e.g., body) are part of the document itself, while others may be metadata directly associated with the document. Still others (e.g., anchor text specified for a hyperlink to the document) may be metadata which is indirectly associated with the document, but is stored with a different document.

Upon computing the linear rank for each document containing a common term, the index time module 112 compares each linear rank to a threshold that indicates whether the document is assigned to the high ranking index 116 or the low ranking index 118. In particular, documents with a linear rank above the threshold are included in the high ranking index 116, and documents with a linear rank below the threshold are included in the low ranking index 118. The high ranking index 116 and the low ranking index 118 map the documents to the respective common term. The high ranking index 116 and the low ranking index 118 may further include a BM25F value or term rank associated with each document. In one embodiment, the threshold is separately selected for each term in such a way that a predefined number of documents are included in the high ranking index 116.

Figure 3:
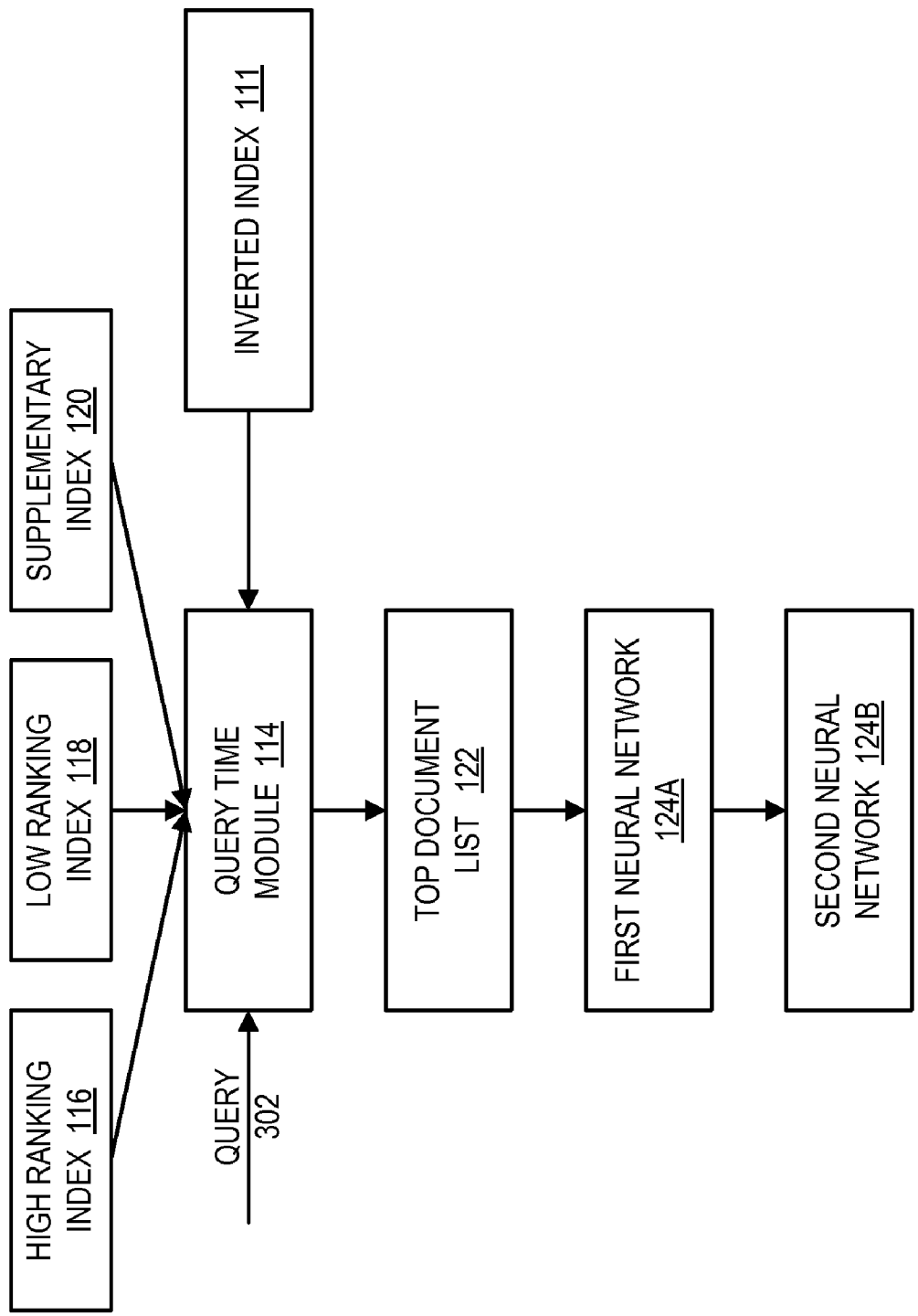
FIG. 3 is a block diagram showing the operation of the query time module and the re-ranking module, in accordance with one embodiment.

Referring now to FIG. 3, additional details will be provided regarding an illustrative implementation of the query time module 114. As illustrated in FIG. 3, the query time module 114 receives a query 302 from the computer 104. The query 302 may include one or more query terms for which documents containing all of the query terms are requested. Upon receiving the query 302, the query time module 114 determines whether one or more of the query terms contained in the query 302 satisfy one of two conditions as described below.

In a first condition, if one or more query terms contained in the query 302 are common terms and are included in the high ranking index 116, then the top document list 122 is populated with at least a subset of documents contained in the high ranking index 116. In one embodiment, the subset of documents includes documents that have the highest linear rank and also satisfy the query 302. As previously discussed, each of the terms in the high ranking index 116 are common terms that map to a sufficiently large number of documents in the inverted index 111. Further, each document included in the high ranking index 116 is considered to be highly relevant for a given term according to the linear rank. As such, limiting the document list 122 to a subset of documents with the highest linear rank still provides relevant documents. For example, for an inverted index containing about 20 million documents and about, about 2,000 documents may be selected to populate the top document list 122.

In a second condition, if none of the query terms contained in the query 302 are common terms (i.e., are not included in the high ranking index 116 and the low ranking index 118), then the top document list 122 is populated with the documents from the inverted index 111 that satisfy the query 302. In one embodiment, the top document list 122 is populated with all of the documents in the inverted index 111 that satisfy the query 302. In the instances in which the terms in the query 302 do not meet either of the two conditions, the index optimization may be skipped.

In one embodiment, the size of the top document list 122 is proportional to the total number of documents that match the query 302. Thus, when the total number of documents that match the query is larger, the size of top document list 122 is larger. Likewise, when the total number of documents that match the query 302 is smaller, the size of top document list 122 is smaller. This approach increases ranking accuracy. However, for performance reasons, the ratio of documents in top document list 122 to the total number of documents that match the query 302 may decrease as the total number of documents that match the query 302 increases.

Upon populating the top document list 122, the query time module 114 forwards the top document list 122 to the neural network 124. The neural network 124 may perform a computationally expensive ranking function on the documents included in the top document list 122. When the query 302 includes at least one term in the high ranking index 116, the size of the top document list 122 provides a significant reduction in size over all of the documents in the inverted index 111 that satisfy the query 302. Further, the size of the top document list 122 may also be reduced by a strong upper limit in which document with only the highest linear rank may be included. By reducing the inverted index 111 into the top document list 122, an otherwise time-consuming operation by the neural network 124 on millions of documents may be reduced to an efficient operation on merely thousands of documents or less.

As illustrated in FIG. 3, the neural network 124 includes a first neural network 124A and a second neural network 124B for re-ranking the top document list 122. The first neural network 124A performs a first re-ranking of the top document list using a first neural network model with a reduced feature set. For example, the first neural network model may re-rank the top document list 122 using the BM25F values provided by the high ranking index 116 and the low ranking index 118. Upon performing the first re-ranking of the top document list 122, the first neural network 124A forwards the top document list 122 to the second neural network 124B, which performs a second re-ranking of the top document list 122 using a second neural network model with a full feature set. For example, the second neural network model may re-rank the top document list 122 using more features that are even more time-consuming than the computation performed by the first neural network model. However, the second neural network 124B may reduce computational time by re-ranking only a top subset of documents from the top document list 122 upon receiving the top document list 122 from the first neural network 124B.

It should be appreciated that the neural network models described herein are merely exemplary, and other ranking methodologies may be utilized to re-rank the top document list 122, as contemplated by those skilled in the art. Further any number of re-ranking operations may be performed. One reason for performing a first re-ranking and second re-ranking is for performance optimization. In particular, re-ranking based on a full feature set, such as a proximity ranking, can be computationally expensive and time consuming.

Figure 4:
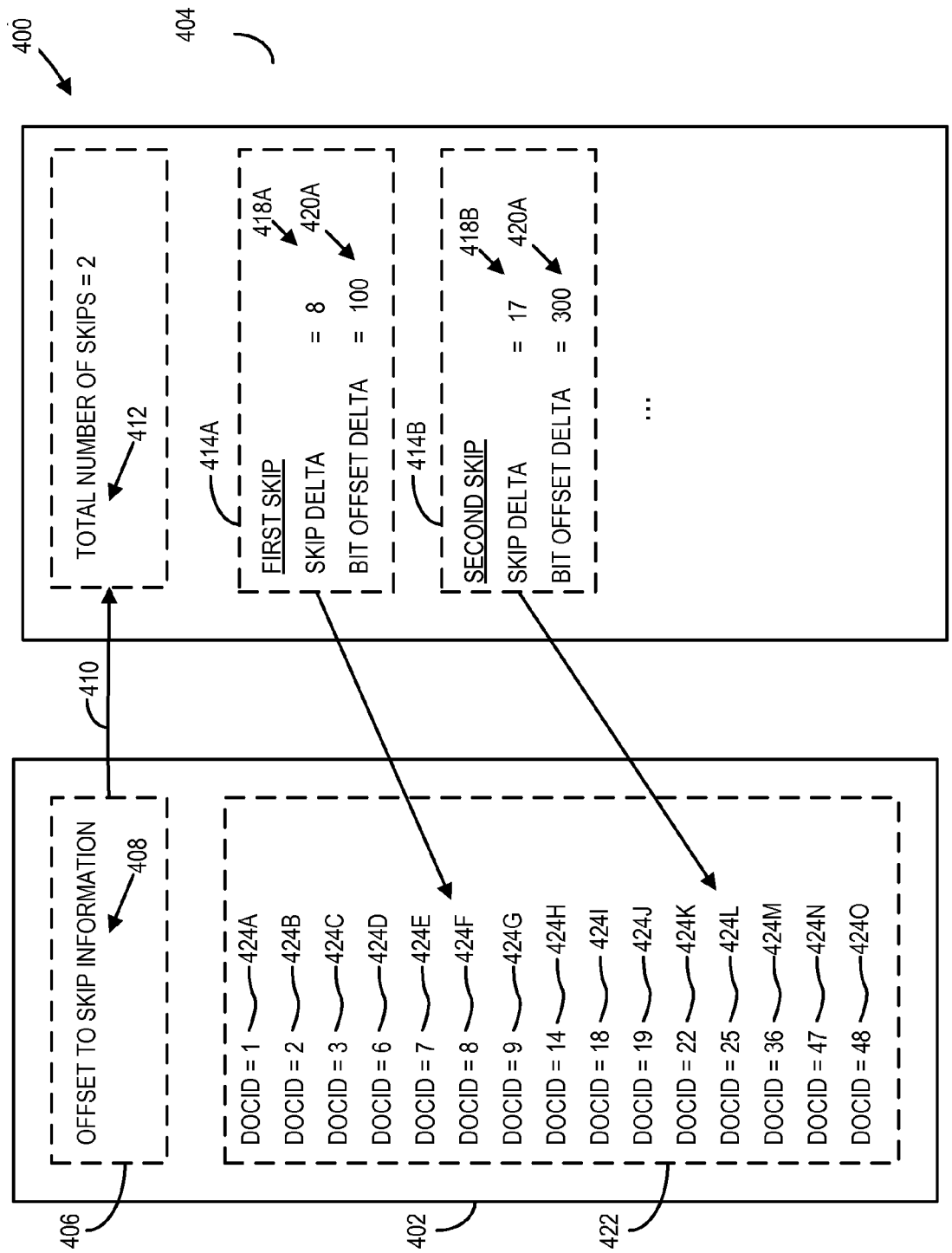
FIG. 4 is a diagram showing the operation of a long-key optimization, in accordance with one embodiment.

Referring now to FIG. 4, details will be provided regarding another optimization referred to herein as a long key optimization. A key refers to a list of documents associated with a term. For example, the key may be included in the inverted index 111, the high ranking index 116, and the low ranking index 118 in order to map each term to a list of documents. Each document is typically referred to by a document identifier. The documents may be sorted sequentially by the document identifier. Since keys are typically compressed using bit level compression, retrieving a document from one of the keys may involve sequentially reading through each entry in the key before accessing the correct document. When a key is sufficiently large (e.g., hundreds of megabytes), thousands of documents or pages may be traversed, which can be computationally expensive and time consuming.

Embodiments described herein provide a key index which enables groups of documents to be skipped without reading them first. The key index is stored at the end of the key. The key index is implemented directly into the key so that any suitable computer application can utilize the key index to enable skipping between groups of documents. As illustrated in FIG. 4, an illustrative key data structure 400 includes a first portion 402 and a second portion 404. The first portion 402 illustrates the beginning of the key data structure 400 and the second portion 404 illustrates the end of the key data structure 400. In the first portion 402, a header 406 is illustrated which includes an offset 408 that points at 410 to the total number of skips 412 in the second portion 404. Also in the first portion 402 is an index record 422 that includes a plurality of document identifiers 424A-424O (collectively referred to as document identifiers 424). In the second portion 404, below the first skip instruction 414A is a second skip instruction 414B. The first skip instruction 414A and the second skip instruction 414B may be generically referred to as a skip instruction 414.

Bit offset deltas 420A-420B specify the difference in offset of the first document identifier read after a current skip from the offset of the first document identifier read after a previous skip (or the beginning of the key for the first skip). The bit offset deltas 420A-420B provide information regarding where skip deltas 418A-418B point at the index record 422. For example, if the document identifier {1} at 424A is at offset 1000 and the document identifier {8} at 424F is at offset 1100, then the value of the bit offset delta 420A is 100 (i.e., 1100−1000=100). Similarly, if the document identifier {25} at 424L is at offset 1400, then the value of the bit offset delta 420B is 300 (i.e., 1400−1100=300). Thus, one hundred bits are used to store information about the document identifiers {1, 2, 3, 6, 7} at 424B-424E between the document identifier {8} at 424F and the document identifier {1} at 424A. Further, three hundred bits are used to store information about the document identifiers {8, 9, 14, 18, 19, 22} at 424G-224K between the document identifier {8} at 424F and the document identifier {25} at 424L. Put in another way, one hundred bits are skipped to pass from the beginning of the key to the beginning of document identifier {8} at 424F, and three hundred bits are skipped to pass from the beginning of document identifier {8} at 424F to the beginning of document identifier {25} at 424L.

The current skip delta 418 specifies a difference between the first document identifier read after a previous skip instruction is performed and the first document identifier read after the current skip instruction is performed. In one example, the current skip delta 418A specifies a value of eight because no skip instruction was previously performed (i.e., the document identifier is zero) and the first document identifier read after the first skip instruction 414A is performed is the document identifier {8} at 424F. The difference between the document identifier {8} at 424F and a document identifier with zero value is eight.

In another example, the current skip delta 418B specifies a value of seventeen because the first document identifier read after the first skip instruction 414A is performed is the document identifier {8} at 424F and the first document identifier read after the second skip instruction 414B is performed is the document identifier {25} at 424L. The difference between the document identifier {25} at 424L and the document identifier {8} at 424F is seventeen.

The skip instructions 414A, 414B enable a computer application to skip to particular portions of the index record 422 in the first portion 402. In an illustrative example, a computer application may be request the document identifier {47} at 424N. In a conventional implementation of a key, the computer application sequentially reads through the following document identifiers {1, 2, 3, 6, 7, 8, 9, 14, 18, 19, 22, 25, 36} at 424A-424M before reading the document identifier {47} at 424N. Using the key index as described herein in embodiments, the computer application can skip to the document identifier {25} at 424L via the first skip instruction 414A and the second skip instruction 414B. As such, the computer application reads only the document identifiers {25, 36} at 424L-424M before reading the document identifier {47} at 424N.

Figure 5A:
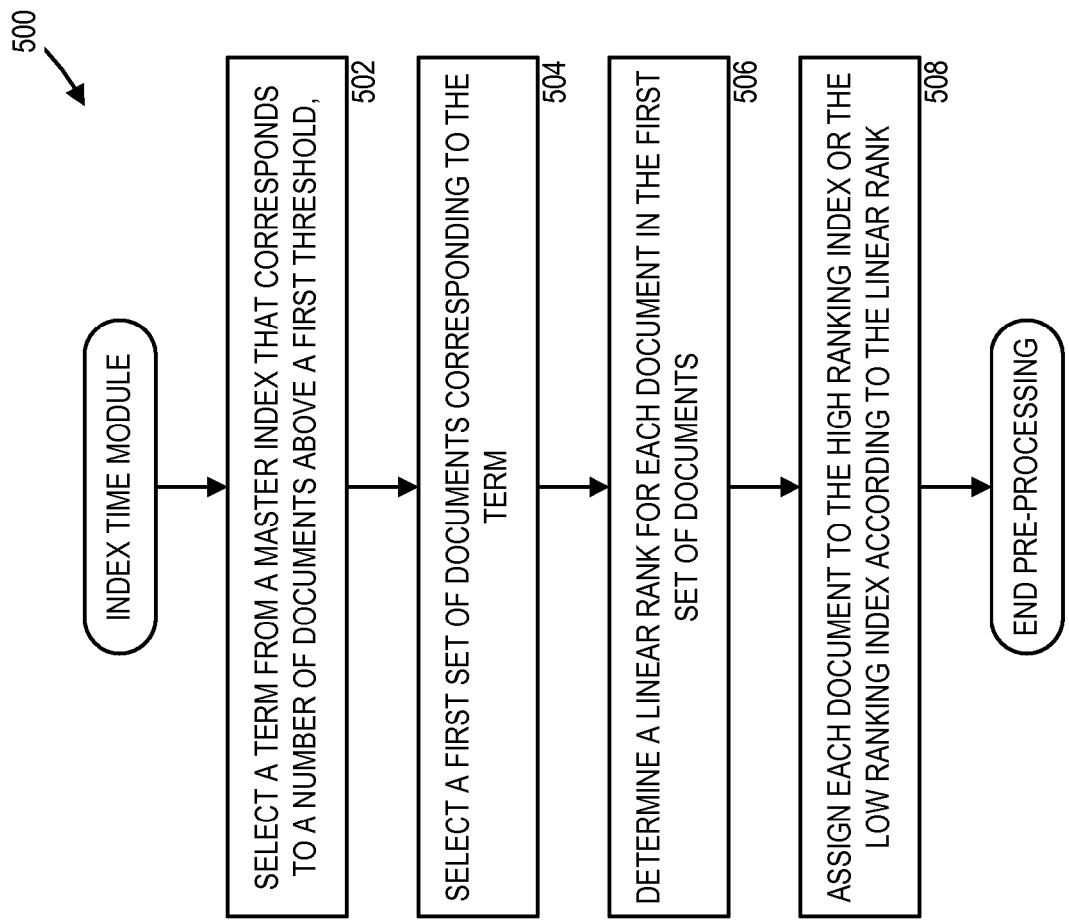
FIG. 5A is a flow diagram showing an illustrative implementation of an index time module, in accordance with one embodiment.
Figure 5B:
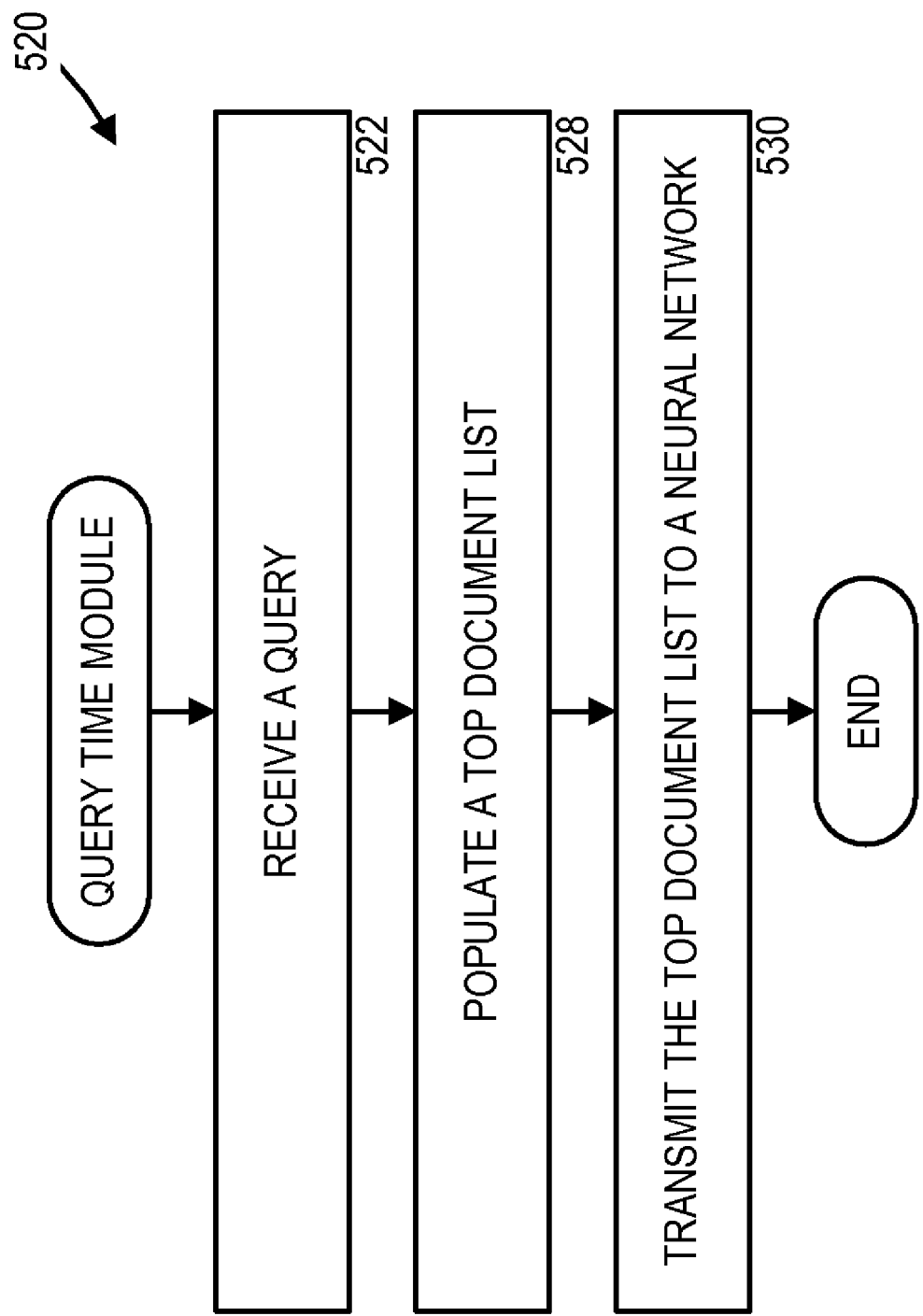
FIG. 5B is a flow diagram showing an illustrative implementation of a query time module, in accordance with one embodiment.

Turning now to FIGS. 5A and 5B, additional details will be provided regarding the operation of the search system 106. In particular, FIG. 5A is a flow diagram illustrating aspects of one method provided herein for performing index time pre-processing of documents from the inverted index 111. FIG. 5B is a flow diagram illustrating aspects of one method provided herein for performing query time processing of a query, such as the query 302, based in accordance with the index time pre-processing of FIG. 5A. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 5A, a routine 500 may be performed by the index time module 112, which operates at index time (i.e., in pre-processing prior to queries being processed). The routine 500 begins at operation 502, where the index time module 112 selects a term from the inverted index 111 (i.e., the master index) that corresponds to a number of documents above a first threshold. In this case, the first threshold may specify a minimum number of documents that are associated with a term in order for the index optimization to be beneficial. When a term is associated with a sufficiently large number of documents, then executing a computationally expensive ranking function, such as a neural network, on every document can be a resource intensive and time-consuming task. As such, these terms, referred to herein as common terms, are selected as candidates for index optimization. Upon selecting the appropriate terms from the inverted index 111, the routine 500 proceeds to operation 504.

At operation 504, the index time module 112 selects a first set of documents corresponding to the selected term. The index time module 112 may access the inverted index 111, which maps the term to corresponding documents that contain the term. In this way, the index time module 112 can easily find which documents are associated with the selected term. The routine 500 then proceeds to operation 506, where the index time module 112 determines a linear rank for each document in the first set of the documents. The linear rank may be based on the term rank (e.g., a BM25F ranking value) for the selected term with respect to the given document as well as the static rank for the given document. Upon determining the linear rank of each document associated with the selected terms, the routine 500 proceeds to operation 508.

At operation 508, the index time module 112 assigns each document in the first set of documents to the high ranking index 116 or the low ranking index 118. In particular, the index time module 112 may assign a document from the first set of documents to the high ranking index 116 if the linear rank of the document for a given term is above a second threshold. Similarly, the index time module 112 may assign a document in the first set of documents to the low ranking index 118 if the linear rank of the document for a given term is below the second threshold. In one embodiment, the high ranking index 116 and the low ranking index 118 further include at least a portion of the linear rank, such as the BM25F value or the term rank, for each common term.

It should be appreciated that operations 502-508 can be repeated for every term in the inverted index 111 that corresponds to a number of documents greater than a first threshold (i.e., the common terms). Although not so illustrated in FIG. 5A, the index time module 112 may also create the supplementary index 120, which includes the static rank for each common term.

Referring to FIG. 5B, a routine 520 may be performed by the query time module 114, which operates at query time (i.e., as a query is processed). The routine 520 begins at operation 522, where the query time module 114 receives a query, such as the query 302, from a user. For example, the user may enter the query 302 through the search interface 110 in the computer 104. The routine 520 then proceeds to operation 528.

At operation 528, the query time module 114 generates the top document list 122 and populates it with a subset of documents that match the query. Upon generating the top document list 122, the routine 520 proceeds to operation 530 where the query time module 114 forwards the top document list 122 to the neural network 124, which re-ranks the top document list 122 according a neural network model or other suitable ranking function. The results of the neural network 124 may be provided to the user via the search interface 110 or to other suitable processes within the search system 106.

Figure 6:
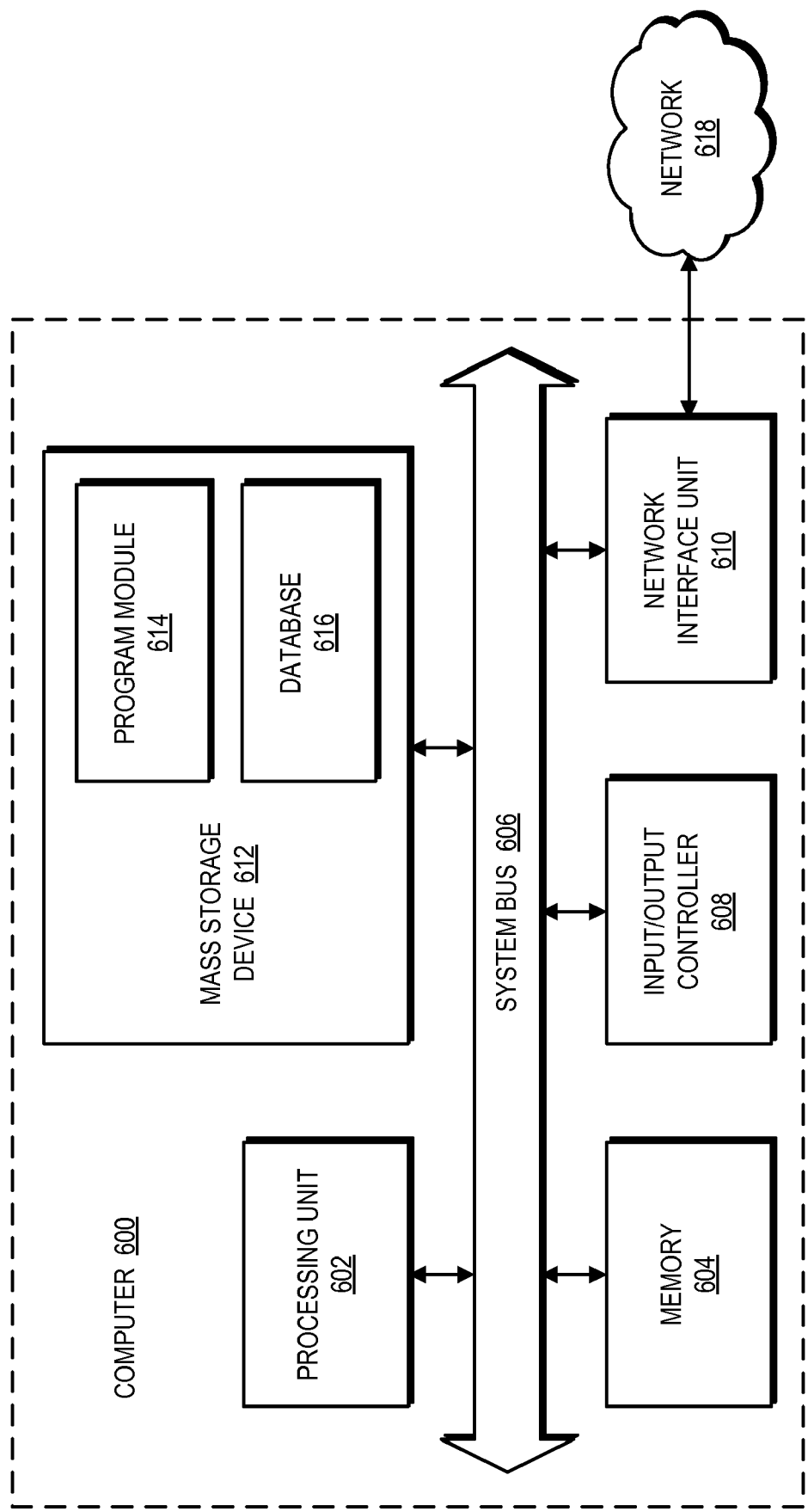
FIG. 6 is a computer architecture diagram showing aspects of an illustrative computer hardware architecture for a computing system capable of implementing aspects of the embodiments presented herein.

Referring now to FIG. 6, an exemplary computer architecture diagram showing aspects of a computer 600 is illustrated. Examples of the computer 600 may include the computer 104 and the search system 106. The computer 600 includes a processing unit 602 ("CPU"), a system memory 604, and a system bus 606 that couples the memory 604 to the CPU 602. The computer 600 further includes a mass storage device 612 for storing one or more program modules 614 and one or more databases 616. Examples of the program modules 614 may include an index time module 112 and a query time module 114. In one embodiment, the program modules 614 may further include a program module adapted to implement the key data structure 400 of FIG. 4. An example of the databases 616 is the database 102. The mass storage device 612 is connected to the CPU 602 through a mass storage controller (not shown) connected to the bus 606. The mass storage device 612 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network 618. An example of the network 618 is the network 108. The computer 600 may connect to the network 618 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

Based on the foregoing, it should be appreciated that technologies for ranking search results are presented herein. In particular, an index optimization is described that incorporates index time pre-processing as well as query time processing based on the pre-processed data. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for reducing an amount of ranking data analyzed at query time, comprising:
   at index time, selecting a term from a master index, the term corresponding to a number of documents greater than a threshold;
   selecting a set of documents that includes the term based on the master index;
   determining a linear rank for each document in the set of documents that contains the term, the linear rank comprising a function of a term rank associated with each term in the each document and a static rank associated with the each document;
   generating a high ranking index containing a first set of documents in the set of documents that contains the term where the linear rank of the each document in the first set of documents is greater than a rank threshold, the rank threshold being different from the threshold;
   generating a low ranking index containing a second set of documents in the set of documents that contains the term where the linear rank of the each document in the second set of documents is less than the rank threshold;
   generating a supplementary index containing the static rank of the each document in the set of documents that contains the term; and
   storing the term rank corresponding to each term-document pair in the high ranking index and the low ranking index.

2. The method of claim 1, wherein the term rank comprises a BM25F ranking value, and wherein the static rank is based upon one or more query-independent properties.

3. The method of claim 1, further comprising:
   at query time, determining whether each query term in a query is common, wherein the each query term is common if the each query term is contained in either one of the high ranking index or the low ranking index;
   upon determining whether the each query term is common, populating a top document list with at least a subset of documents that satisfy the query, wherein the subset of documents comprises only documents in the high ranking index if the query term is common, and wherein the subset of documents comprises all documents from the master index if the query term is uncommon; and upon populating the top document list, transmitting the top document list to a ranking function configured to re-rank the documents in the top document list at the query time.

4. The method of claim 3, wherein the ranking function comprises a first neural network and a second neural network, the first neural network being based on a reduced feature set, and the second neural network being based on a full feature set.

5. The method of claim 3, wherein the top document list comprises documents that include every term in the query.

6. The method of claim 3, wherein populating a top document list with at least a subset of documents that satisfy the query comprises selecting a highest ranking subset of documents that satisfy the query.

7. A method for reducing an amount of ranking data analyzed at query time, comprising:
  (a) at index time, selecting a term from a master index, where a number of documents containing the term is greater than a threshold;
  (b) selecting a set of documents that includes the term based on the master index;
  (c) determining a linear rank for each document in the set of documents that contains the term, the linear rank comprising a function of a term rank associated with each term in the each document and a static rank associated with the each document;
  (d) populating a high ranking index containing a first set of documents in the set of documents that contains the term where the linear rank of the each document in the first set of documents is greater than a rank threshold, the rank threshold being different from the threshold;
  (e) populating a low ranking index containing a second set of documents in the set of documents that contains the term where the linear rank of the each document in the second set of documents is less than the rank threshold;
  (f) repeating operations (b)-(e) during the index time for additional terms from the master index, where the number of documents containing each of the additional terms is greater than the threshold;
  (g) generating a supplementary index containing the static rank of the each document in the set of documents that contains the term;
  (h) storing the term rank corresponding to each term-document pair in the high ranking index and the low ranking index;
  (i) at query time, determining whether each query term in a query is common, wherein the each query term is common if the each query term is contained in either one of the high ranking index or the low ranking index, wherein the each query term is uncommon if the each query term is not contained in both the high ranking index and the low ranking index;
  (j) upon determining whether the each query term is common, populating a top document list with at least a subset of documents that satisfy the query, wherein the subset of documents comprises only documents in the high ranking index if the query term is common, and wherein the subset of documents comprises all documents from the master index if the query term is uncommon; and
  (k) upon populating the top document list, transmitting the top document list to a ranking function configured to re-rank the documents in the top document list.

8. The method of claim 7, wherein the term rank comprises a BM25F ranking value, and wherein the static rank is based upon one or more query-independent properties.

9. The method of claim 7, wherein the ranking function comprises a first neural network and a second neural network.

10. The method of claim 9, wherein the first neural network is based on a reduced feature set, and the second neural network is based on a full feature set.

11. The method of claim 9, wherein the first neural network re-ranks the subset of documents based on information including the static rank provided by the supplementary index.

* * * * *